United States Patent [19]

Noda et al.

[11] 4,442,177

[45] Apr. 10, 1984

[54] ALKYL ETHER METHYLOLMELAMINE COATING COMPOSITION, COATING PROCESS AND TRANSPARENT PRODUCT

[75] Inventors: Akinori Noda; Seiichi Miyasaka; Hiroshi Kawahara, all of Yokohama, Japan

[73] Assignee: Asahi Glass Company, Ltd., Tokyo, Japan

[21] Appl. No.: 250,071

[22] Filed: Apr. 1, 1981

[30] Foreign Application Priority Data

Apr. 4, 1980 [JP] Japan ................................. 55-43527

[51] Int. Cl.³ .......................... B32B 27/42; B05D 3/02
[52] U.S. Cl. ..................................... 428/412; 427/162; 427/163; 427/164; 427/393.5; 428/423.1; 428/425.3; 428/425.5; 428/426; 428/428; 428/436; 428/446; 428/501; 428/522; 524/233; 524/391; 524/597
[58] Field of Search ................... 528/28, 29; 428/412, 428/423.1, 425.5, 425.3, 426, 428, 436, 446, 501, 522; 427/162, 163, 164, 393.5; 524/233, 391, 597

[56] References Cited

U.S. PATENT DOCUMENTS

| | | |
|---|---|---|
| 4,082,894 | 4/1978 | Yoshida ........................ 427/164 X |
| 4,088,807 | 6/1978 | Sakata . |
| 4,207,357 | 6/1980 | Goossens ......................... 427/162 |
| 4,242,412 | 12/1980 | Funaki et al. ...................... 428/412 |
| 4,242,413 | 12/1980 | Iwahashi et al. ................... 428/412 |
| 4,284,685 | 8/1981 | Olsen et al. .................... 427/164 X |

OTHER PUBLICATIONS

Chemical Abstracts, vol. 86, 1977, p. 98, Abstract 56926z; Columbus, Ohio, US & JP-A-76 126264 (Mitsubishi Chem) (04–11–1976) *Whole Abstract*.
Patent Abstracts of Japan, vol. 2, No. 85, Jul. 12, 1978, p. 1339 C 78 & JP-A 53 47431 (Sumitomo) *Whole Abstract*.

*Primary Examiner*—Thurman K. Page
*Attorney, Agent, or Firm*—Oblon, Fisher, Spivak, McClelland & Maier

[57] ABSTRACT

A coating composition comprises
(A) an alkyl ether methylolmelamine in which a part or whole of methylol groups of methylolmelamine are converted into alkyl ether methylol groups;
(B) a polyhydric alcohol having 2 or more hydroxyl groups; and
(C) a dispersion of colloidal silica which can be condensed each other for the two or three components; and
(D) a solvent.

13 Claims, No Drawings

ALKYL ETHER METHYLOLMELAMINE COATING COMPOSITION, COATING PROCESS AND TRANSPARENT PRODUCT

BACKGROUND OF THE INVENTION

1. Field of the Invention

The present invention relates to a coating composition to provide a coated layer having excellent mar resistance and transparency. More particularly, it relates to a coating composition used for improving mar resistance of a transparent plastic product.

2. Description of the Prior Arts

In usual, plastic products such as products of polycarbonate, polymethyl, methacrylate, polyestyrene, polyvinyl chloride and ABS resin have been used in various field because of excellent light weight, processability and impact strength etc. The surface hardnesses of the plastic products are relatively whereby the surface is easily damaged or the appearance is deteriorated or the transparency of the product is easily lost. Thus, the plastic products could not be used in certain fields requiring high transparency and mar resistance, such as lense for eye glass, headlight lense for cars and organic glass for car windows, etc.

Certain coating compositions for improving surface hardness of plastic products have been known. For example, organic materials such as melamine resin and high hardness acryl resins, inorganic materials such as silica coated by an evaporation and organic-inorganic material such as polyalkyl siloxane obtained by hydrolysis of an organic silane. Some of the organic materials have desired hardness measured by forcibly falling sand, however the organic materials have not desired hardness measured an emery paper test or an eraser rubber test. On the other hand, the inorganic materials and the organic-inorganic materials have relatively high hardness, however, costs for the materials and the coatings are relatively high.

SUMMARY OF THE INVENTION

It is an object of the present invention to provide a coating composition which forms a coated layer having high hardness on a plastic product to give satisfactory results in impact strength tests and abrasion tests such as the sand falling test, the emery paper test and the eraser rubber test.

It is another object of the present invention to provide a coating composition which forms a coated layer having excellent transparency and durable glossness on a plastic product.

It is the other object of the present invention to provide a coating composition which forms an organic-inorganic coated layer which is economical.

The foregoing and other objects of the present invention have been attained by providing a coating composition which comprises (A) an alkyl ether methylolmelamine in which a part or whole of methylol groups of methylolmelamine are converted into alkyl ether methylol groups;
(B) a polyhydric alcohol having 2 or more hydroxyl groups; and
(C) a dispersion of colloidal silica which can be condensed each other for the two or three components; and
(D) a solvent.

DETAILED DESCRIPTION OF THE PREFERRED EMBODIMENTS

The coating compositions comprising an organic silicon compound such as tetraalkoxysilanes and alkyl trialkoxysilanes or hydrolyzed product thereof and alkyl ether methylolmelamine and polyhydric alcohol have been known in Japanese Unexamined Patent Publication No. 126264/1976 and No. 101235/1977. However, the hydrolyzed product of tetraalkoxysilane is in a form of flock and has a low content of silica. Moreover, silanes having alkoxy group are remained by the hydrolysis because of difficulty of the complete hydrolysis. In the hydrolysis of alkyl trialkoxysilanes, silanes having alkyl group are remained at higher ratio. The hydrolyzed products have not enough reactive silanol groups in comparison with the colloidal silica used in the present invention. The hardness of a coated layer could not be satisfactorily improved by incorporating the hydrolyzed product of the organic silicon compound. On the other hand, the hydrolysis of the organic silicon compound is slow to require 1 to 10 days for the preparation as described in the abovementioned prior art. The resulting dispersion is not stable to cause a precipitation. The organic silicon compound is relatively expensive in uneconomical.

The dispersion of colloidal silica (C) used in the present invention overcome the disadvantages caused by the use of the hydrolyzed products of the organic silicon compounds. The colloidal silica (C) is in a form of fine particles having a substantially spherical shape and low impurity and has a relatively high content of silanol groups on the surface. Therefore, the reaction of the silanol groups with the reactive components is easily resulted and a coated layer having high hardness is easily obtained. The stable dispersion of colloidal silica (C) is commercially available.

The feature of the present invention is to use the dispersion of colloidal silica (C). The object of the present invention is attained by the use of the dispersion of colloidal silica.

Dispersion of Colloidal Silica (C)

The colloidal silica (C) used in the coating composition of the present invention is in a form of fine particles having substantially spherical shape and an average diameter of about 20 to 500 Å. The colloidal silica is usually obtained by an ion exchange process from a water glass and is inorganic silica. The colloidal silica (C) is available in a form of a stable dispersion of colloidal silica in water or an organic medium. The dispersion of the colloidal silica (C) can be prepared by an ion exchange process from the water glass. The dispersion of colloidal silica (C) can be used in the present invention. It is also possible to use a dispersion of colloidal silica (C) obtained by the other process such as a dialysis from water glass and other processes. It is preferable to use a dispersion of colloidal silica (C) obtained by an ion exchange process or a dialysis from water glass. The particle diameter of the colloidal silica is preferably in a range of about 20 to 500 Å. Transparency of the coated layer is lowered depending upon an increase of the particle diameter whereas hardness of the coated layer is lowered depending upon a decrease of the particle diameter. The desired particle diameter is in the range of 50 to 250 Å. The colloidal silica (C) has about 3 to 4 of silanol groups per 100 square angstrom.

The medium of the colloidal silica (C) can be inorganic media such as water or organic media such as alcohols, hydrocarbons, ethers, esters and ketones. The desired medium is an organic medium especially an alcohol. It is also preferable to use a hydrocarbon such as toluene or an ether such as 1,4-dioxane.

Among alcohols, it is especially preferable to use a $C_1$–$C_6$ monohydric alcohol such as methanol, ethanol, propanol, isopropanol, butanol, isobutanol, 2-methoxyethanol, 2-ethoxyethanol and 2-butoxyethanol. It is especially preferable to use a $C_1$–$C_4$ monohydric alcohol such as methanol, ethanol and isopropanol. The medium of the commercial colloidal silica is usually water. The water dispersion can be converted into an organic medium dispersion by a substitution of a medium. For example, a water miscible organic medium is added to the water dispersion and water is separated by an ultrafiltration. An organic medium having a boiling point of higher than 100° C. is added and water is separated by a distillation. An organic medium dispersion can be converted into another organic medium dispersion by the similar process.

Alkyl Ether Methylolmelamine (A)

Methylolmelamine is obtained by reacting melamine with formaldehyde. Sometimes, it contains a partially condensed methylolmelamine. It is preferable to use methylolmelamine having 3 to 6 of methylol groups as a source of the alkyl ether methylolmelamine. In the case of condensed methylolmelamine, it is preferable to have 3 or more methylol groups.

The alkyl ether methylolmelamine (A) can be obtained by a reaction of methylolmelamine (condensed methylolmelamine can be included) with an alcohol such as a $C_1$–$C_4$ monohydric alcohol as methanol, ethanol, propanol, isopropanol, butanol, isobutanol etc. Methylolmelamine containing less condensed methylolmelamine is preferably converted into methyl or ethyl ether thereof. Methylolmelamine containing much condensed methylolmelamine is preferably converted into a $C_3$–$C_4$ alkyl ether thereof. All of methylol groups are preferably converted into ether groups though parts of methylol groups can be converted into ether groups.

The alkyl ether methylolmelamine (A) can be single or a mixture thereof.

In the present invention, the optimum alkyl ether methylolmelamine (A) is hexaquis methoxymethylmelamine.

It is also preferable to use methyl ether methoxymelamines such as hexamethylolmelamine pentamethyl ether, hexamethylolmelamine tetramethyl ether, pentamethylolmelamine pentamethyl ether, pentamethylolmelamine tetramethyl ether, pentamethylolmelamine trimethyl ether, tetramethylolmelamine tetramethyl ether, tetramethylolmelamine trimethyl ether, trimethylolmelamine trimethyl ether.

Polyhydric Alcohols (B)

The polyhydric alcohols (B) having 2 or more hydroxyl groups can be aliphatic polyhydric alcohols, alicyclic polyhydric alcohols, aromatic polyhydric alcohols, polyester polyols, polyether polyols and the other polyhydric alcohols. It is preferable to use the polyhydric alcohols having 2 to 4 of hydroxyl groups and a molecular weight of 60 to 5,000 especially 60 to 2,000. It is preferable to use a liquid polyhydric alcohol. One or more polyhydric alcohols can be used.

Suitable polyhydric alcohols are not critical and can be aliphatic polyhydric alcohols such as ethyleneglycol, propyleneglycol, 1,4-butanediol, 1,5-pentanediol, hexyleneglycol, glycerine, 1,6-hexanediol, trimethylolpropane and pentaerythritol; polyether polyols such as diethyleneglycol, triethyleneglycol, tetraethyleneglycol, other polyethyleneglycols, dipropyleneglycol, other polypropyleneglycols, diglycerine and polyether polyols as adducts of alkyleneoxide to polyhydric alcohol or amine; alicyclic polyhydric alcohols such as 1,4-cyclohexanediol, 1,4-cyclohexanedimethanol, hydrogenized bisphenol A; and other polyhydric alcohols such as bis(hydroxyethyl) phthalate, and polyester polyols obtained by reacting succinic acid or adipic acid with ethyleneglycol.

The preferable polyhydric alcohols (B) can be aliphatic polyhydric alcohols, polyether polyols and alicyclic polyhydric alcohols. The optimum polyhydric alcohols can be $C_2$–$C_8$ aliphatic diols and triols and polyethyleneglycols of polymerization degree of up to 8 and $C_{6-16}$ alicyclic diols.

Solvents (D)

Various solvents especially, organic solvents can be used.

The solvent can be the same as or different from the medium of the dispersion of colloidal silica. When the medium of the dispersion of colloidal silica is used as the solvent, it is possible to prepare the coating composition without an addition of a solvent. For example, the alkyl ether methylolmelamine, polyhydric alcohol and the dispersion of a colloidal silica are mixed to prepare the coating composition containing the solvent (D). The solvent (D) can be $C_1$–$C_6$ monohydric alcohols, hydrocarbons such as toluene and N,N-dimethylformamide as described for the media of the dispersion of colloidal silica (C). The solvent (D) can be single or a mixture thereof.

In order to improve the dryness of the coating composition, it is possible to use a low boiling solvent such as ethyl acetate, acetone, methyl ethyl ketone, butylcellosolve etc. The low boiling point solvent is especially effective for improving the dryness of the coating composition of the present invention. If a ratio of the low boiling point solvent is high, the colloidal silica is easily precipitated to deteriorate the transparency of the coated layer. The coating composition of the present invention preferably does not contain water. Thus, the medium of the dispersion of colloidal silica is preferably an organic medium which does not substantially contain water and the solvent (D) preferably contain less or no low boiling point solvent.

Additional Components

In the coating composition of the present invention, it is possible to incorporate the other components especially a catalyst for accelerating the reaction of the alkyl ether methylolmelamine (A) with the polyhydric alcohol (B) or the reaction of the polyhydric alcohol (B) with the colloidal silica (reaction of hydroxyl groups of the polyhydric alcohol with silanol groups of the colloidal silica). The catalysts can be the curing accelerator for melamine resins and are effective for one or both of the reactions.

Suitable catalysts can be ammonium chloride, ammonium nitrate, ammonium thiocanate, phosphoric acid, p-toluenesulfonic acid and alkylsulfonic acid. An amount of the catalyst is preferably in a range of 0.01 to 2 wt.% based on the total organic solid components in the coating composition and is not critical.

The other additional components include stabilizers such as ultraviolet absorption agents, coloring agents and other additives for a coating composition.

Composition (I)

One kind of the coating composition of the present invention is the mixture of the alkyl ether methylolmelamine (A), the polyhydric alcohol (B), the dispersion of colloidal silica (C) and the solvent (D). When the medium of the dispersion of colloidal silica (C) is the same as the solvent (D), the solvent (D) need not to be further added. The coating composition comprises the four components, (A), (B), (C) and (D) and preferably comprises the five components (A), (B), (C), (D) and the catalyst.

The ratios of the alkyl ether methylolmelamine (A), the polyhydric alcohol (B) and the colloidal silica (C) are not critical and are preferable as follows in view of suitable hardness, water resistance and other properties of the coated layer formed by the coating composition.

A gram equivalent ratio of the alkyl ether methylolmelamine (A) to the polyhydric alcohol is in a range of 1:0.5 to 2. The gram equivalents are considered by a ratio of alkyl ether groups (including methylol groups) of the alkyl ether methylolmelamine (A) to hydroxyl groups of the polyhydric alcohol (B). (When the alkyl ether methylolmelamine has free methylol groups, the number of methyl groups, is also calculated as the number of the alkyl ether groups.) When the ratio of the alkyl ether methylolmelamine (A) is higher than the range, the fabricatability of the coated layer is good but the hardness of the coated layer is inferior. On the other hand, when it is lower the range, the water resistance of the coated layer is inferior.

A ratio of the polyhydric alcohol (B) to the colloidal silica (C) is preferably in a range of 1:0.1 to 4 by weight. When the ratio of the colloidal silica is higher than the range, the emery paper hardness is superior but the sand falling hardness is inferior. In the range of 1:0.5 to 1 of the ratio of the polyhydric alcohol (B) to the colloidal silica (C). Taber hardness is not varied in a desired level, but it is inferior out of the range. Thus, it is preferable to be a ratio of the polyhydric alcohol (B) to the colloidal silica (C) of 1:0.5 to 1 by weight.

Composition (II)

The coating composition of the present invention is preferably comprises a condensation product of 2 or 3 of the components (A), (B) and (C). The alkyl ether methylolmelamine (A), the polyhydric alcohol (B) and the colloidal silica (C) are reactive each other. The other nonreactive components can be incorporated before, during or after the condensation. The colloidal silica (C) is used in a form of a dispersion. When the medium of the dispersion is the same as the solvent (D), the condensation of the colloidal silica with the other reactive component can be carried out in the solvent (D). The catalyst usually accelerates the condensation, whereby it is preferable to incorporate the catalyst in the condensation.

When the reactive two components are condensed, the coating composition comprises the condensed product and the remained reactive components and the non-reactive components. The condensed product can be the product obtained by reacting parts of the reactive components. For example, a part of the polyhydric alcohol (B) is condensed with the other reactive component and the remained polyhydric alcohol (B) is added to prepare the coating composition. The condensation can be carried out in two or more steps. For example, the condensation product of the alkyl ether methylolmelamine (A) with the polyhydric alcohol (B) is further condensed with the colloidal silica to obtain the condensation product for the coating composition.

The condensation product is preferably the product obtained by condensing the three components (A), (B) and (C) especially the product obtained by condensing the three components at the same time or the product obtained by condensing the alkyl ether methylolmelamine (A) with the condensation product of the polyhydric alcohol (B) with the colloidal silica (C).

The main sources of the components of the composition (II) are the same as the main components of the composition (I) which include the four components (A), (B), (C) and (D) and the catalyst.

The composition (II), comprises the condensation product of two or more reactive components and the remained reactive components and the solvent preferably with the catalyst. The ratios of the sources of the components, before the condensation, are not critical and preferably are the same as the ratios of the components of the composition (I).

Formation of Coated Layer

The coating composition of the present invention can be coated on a substrate by conventional coating processes such as a spray coating, a dip coating, a brush coating, a roller coating and a spinner coating. After the coating, the coated layer is preferably cured by heating at 80° to 150° C. especially 100° to 130° C. for 15 minutes to 2 hours especially 30 minutes to 1 hour. A thickness of the coated layer is in a range of 2 to 20$\mu$ especially 5 to 15$\mu$. The condition for the coating can be the other condition.

Uses

The coating composition of the present invention is used for forming a transparent hard coated layer on a surface of a plastic product.

Various synthetic resins such as polycarbonate resins, homopolymers and copolymers of unsaturated carbonate such as diethyleneglycol bisallylcarbonate, acryl resins such as polymethyl methacrylate, polystyrene resins, and polyurethane resins can be used as the plastics. The polycarbonate resins, the unsaturated carbonate polymer resins and the acryl resins are especially preferable transparent resins. The plastic products can be lense for headlamp of car, lenses for eye glass and transparent plates for car windows and are not critical. The coating composition of the present invention can form the coated layer which is firmly bonded to the plastic product. If the adhesive strength is not high enough, a primer is coated on the surface of the plastic product before coating the coating composition of the present invention.

Tests

The hardness is evaluated by the following test methods in the examples and references.
Pencil hardness: JIS K-5400
Sand falling hardness: JIS T-8147
Emery hardness: Weight: 500 g/cm$^2$
Sliding distance: 4 cm
Sliding speed: 35 turns/min.

Sliding turns: 500 times
Abrasion test by #1500 SiC emery paper.
Taber hardness: American National Standard Institute (ANST) Z 26.1; measured after abrasion for 1,000 times.

The hardnesses as shown by Haze difference (%) except the pencil test. Haze difference % is a different between a value measured by a Haze meter after each test and a value measured by a Haze meter before each test.

The present invention will be further illustrated by certain examples and references which are provided for purposes of illustration only and are not intended to be limiting the present invention.

EXAMPLES 1 TO 8

100 Weight part of a dispersion of colloidal silica as spherical particles having an average diameter of 110 Å in isopropanol (silica content of 30 wt.%) was admixed with 60 wt. part of each polyhydric alcohol and hexaquismethoxy methylmelamine at a gram equivalent of 1:1 of the polyhydric alcohol to the melamine and then, phosphoric acid was added at a ratio of 0.5 wt.% based on the total content of the organic solid components. A condensation was carried out at 130° to 150° C. under distelling off the solvent to obtain a condensated prepolymer having an average molecular weight of about $3 \times 10^4$ (calculated as polystyrene by GPC process. To 10 g. of the prepolymer, 5 g. of 2-ethoxyethanol and 0.05 g. of p-toluenesulfonic acid as a catalystm were added and mixed to prepare a coating composition. The coating composition was coated on a deoiled polycarbonate product having a thickness of 3 mm at a dry thickness of 10μ by a dipping process, and the coated layer was dried at 130° C. for 1 hour. The physical properties of the coated layer were measured.

The colloidal silica dispersion was prepared by adding isopropanol to an aqueous dispersion of colloidal silica obtained by deionizing from an aqueous solution of water glass with an ion exchange resin and distilling off water from the mixture.

In the same process, the following dispersion of colloidal silica was obtained.

REFERENCES 1 TO 2

In accordance with the process of Examples 1 to 8 except that a dispersion of colloidal silica was not added, each coated layer was prepared by using hexaquismethoxy methylmelamine and the polyhydric alcohol and the physical properties of the coated layer was measured. Thus, it is found that the mar resistance is remarkably improved by the incorporation of the colloidal silica. The results are shown in Table 1.

TABLE 1

| No. | Polyhydric alcohol | Pencil hardness | Sand falling hardness | Emery hardness | Taber hardness |
|---|---|---|---|---|---|
| Exp. 1 | Diethyleneglycol | 5H | 3.25 | 9.76 | 4.76 |
| Exp. 2 | Triethyleneglycol | 5H | 4.19 | 10.11 | 5.01 |
| Exp. 3 | Tetraethyleneglycol | 5H | 2.76 | 10.26 | 3.37 |
| Exp. 4 | 1,4-butanediol | 5H | 4.83 | 11.12 | 5.76 |
| Exp. 5 | Hexyleneglycol | 5H | 5.76 | 13.88 | 8.11 |
| Exp. 6 | 1,4-cyclohexane diol (50) Tetraethyleneglycol (50) | 5H | 4.21 | 13.91 | 10.53 |
| Exp. 7 | Hydrogenated bisphenol A | 5H | 3.77 | 14.72 | 12.76 |
| Exp. 8 | Glycerine | 5H | 5.33 | 15.67 | 14.51 |
| Ref. 1 | Diethyleneglycol | 4H | 5.34 | 33.22 | 30.97 |
| Ref. 2 | Tetraethyleneglycol | 4H | 5.68 | 35.68 | 31.03 |

Note:
Haze % for all data.

EXAMPLES 9 TO 12

60 Weight part of tetraethyleneglycol was admixed with a dispersion of colloid silica having an average diameter of 120 Å in 2-ethoxyethanol (silica content of 30 wt.%) at a ratio of 0.2 to 2.5:1 of the silica content to the diol by weight and then, 36 wt. part of hexaquismethoxy methylmelamine was added and then, phosphoric acid was added at a ratio of 0.2 wt.% based on the total content of the solid organic components. A condensation was carried out by distilling off the solvent at 130°-150° C. to obtain the prepolymer having an average molecular weight of about $3 \times 10^4$.

To 10 g. of the prepolymer, 5 g. of isopropanol and 1 g. of butylated melamine (Super Becamine J 820: Nippon Rheihihold K.K.) were added and 0.05 g. of p-toluenesulfonic acid as a catalyst was added and mixed to prepare a coating composition. The coating composition was coated on a deoiled polycarbonate product having a thickness of 3 mm at a dry thickness of 8μ by a spinner process and the coated layer was dried at 130° C. for 1 hour. The physical properties of the coated layer were measured. The results are shown in Table 2.

TABLE 2

| No. | Content of silica (ratio) | Pencil hardness | Sand falling hardness | Emery hardness | Taber hardness |
|---|---|---|---|---|---|
| Exp. 9 | 0.2 | 5H | 5.33 | 25.0 | 14.51 |
| Exp. 10 | 0.5 | 5H | 2.71 | 10.75 | 3.37 |
| Exp. 11 | 1.0 | 5H | 4.68 | 9.22 | 4.12 |
| Exp. 12 | 2.5 | 5H | 8.75 | 7.25 | 8.36 |
| Ref. 2 | 0 | 4H | 5.68 | 35.68 | 32.12 |

Note:
Haze % for all data.

EXAMPLES 13 TO 15

60 Weight part of triethyleneglycol was admixed with 100 wt. part of each dispersion of colloidal silica having each different average diameter in 1,4-dioxane (silica content of 30 wt.%) and the mixture was heated at 50° C. under a reduced pressure to distill off 70 wt. part of 1,4-dioxane as the solvent and 40 wt. part of hexaquismethoxy methylmelamine was added. To 10 g. of the mixture, 5 g. of 2-ethoxyethanol and 0.1 g. of p-toluenesulfonic acid were added to prepare each coating composition. Each coating composition was coated on a deoiled CR-39 plate having a thickness of 2 mm at a dry thickness of 12μ by a spinner process and the coated layer was dried at 110° C. for 1 hour. The physical properties of the coated layer were measured. The results are shown in Table 3.

TABLE 3

| | Diameter of silica | Pencil hardness | Sand falling hardness | Emery hardness | Taber hardness |
|---|---|---|---|---|---|
| Exp. 13 | 70 Å | 5H | 3.00 | 12.36 | 8.26 |
| Exp. 14 | 120 Å | 5H | 3.42 | 9.87 | 3.81 |
| Exp. 15 | 250 Å | 5H | 3.12 | 6.53 | 3.20 |

Note:
Haze % for all data.

EXAMPLE 16

60 Weight part of tetraethyleneglycol was admixed with 150 wt. part of a dispersion of colloidal silica having an average diameter of 120 Å in isopropanol (silica content of 30 wt.%), 54 wt. part of n-butyl ether methylolmelamine (Super Betcamine J 820: Nippon Rheihihold K.K.) were admixed and then, 1.14 wt. part of phosphoric acid was added. A condensation was carried out at 130° to 150° C. under distilling off the solvent to obtain a prepolymer having an average molecular weight of about $3 \times 10^4$. To 10 g. of the prepolymer, 6 g. of n-butanol was added and 0.06 g. of p-toluenesulfonic acid as a catalyst was added and mixed to prepare a coating composition. The coating composition was coated on a deoiled polycarbonate product and the physical properties of the coated layer were measured as set forth in Example 1. The results are as follows:

Pencil hardness: 5H
Sand falling hardness: 7.2% as Haze %
Emery hardness: 12.3% as Haze %
Taber hardness: 9.6% as Haze %

We claim:

1. A coating composition which comprises:
   (A) an alkyl ether methylolmelamine in which a part or whole of methylol groups of methylolmelamine are converted into alkyl ether methylol groups;
   (B) a polyhydric alcohol having 2 or more hydroxyl groups; and
   (C) a dispersion of colloidal silica having about 3 to 4 silanol groups per 100 square Angstroms and which can be condensed with one or more of the components (A), (B), or (C); and
   (D) a solvent.
2. The coating composition according to claim 1 wherein said dispersion of colloidal silica is a dispersion of a colloidal silica obtained from water glass.
3. The coating composition according to claim 1 wherein said dispersion of colloidal silica is a dispersion in an organic solvent.
4. The coating composition according to claim 1 wherein said colloidal silica has an average particle diameter ranging from about 20 to 500 Å.
5. The coating composition according to claim 1 wherein said polyhydric alcohol has a molecular weight ranging from about 60 to 5,000.
6. The coating composition according to claim 1 which further comprises a catalyst.
7. The coating composition according to claim 1 wherein the two or three components of (A), (B) and (C) are condensed in the presence of a catalyst.
8. The coating composition according to claim 1 wherein the three components of (A), (B) and (C) are condensed at the same time.
9. The coating composition according to claim 1 wherein said polyhydric alcohol is condensed with said colloidal silica and further said alkyl ether methylolmelamine is condensed.
10. The coating composition according to claim 1, 7 or 8 wherein a gram equivalent ratio of said alkyl ether methylolmelamine to said polyhydric alcohol is 1:0.5-2.
11. The coating composition according to claim 1, 7 or 8 wherein a ratio of said polyhydric alcohol to said colloidal silica is 1:0.1-4 by weight.
12. A process for producing a transparent hard coat on a substrate comprising forming on said substrate a layer of a coating composition of claim 1 followed by heat curing of said composition.
13. A transparent plastic product having a hard coated layer formed thereon according to claim 12.

* * * * *